US012609868B2

(12) United States Patent
Yuan et al.

(10) Patent No.: US 12,609,868 B2
(45) Date of Patent: Apr. 21, 2026

(54) DIGITAL TWIN SUBSYSTEM AND SERVICE PROVIDING APPARATUS

(71) Applicant: VIVO MOBILE COMMUNICATION CO., LTD., Guangdong (CN)

(72) Inventors: Yannan Yuan, Guangdong (CN); Xiaobo Wu, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 148 days.

(21) Appl. No.: 18/416,003

(22) Filed: Jan. 18, 2024

(65) Prior Publication Data

US 2024/0154876 A1 May 9, 2024

Related U.S. Application Data

(63) Continuation of application No. PCT/CN2022/106727, filed on Jul. 20, 2022.

(30) Foreign Application Priority Data

Jul. 23, 2021 (CN) .......................... 202110839328.2

(51) Int. Cl.
*G06F 13/00* (2006.01)
*H04L 41/0806* (2022.01)
*H04L 41/0895* (2022.01)

(52) U.S. Cl.
CPC ...... *H04L 41/0895* (2022.05); *H04L 41/0806* (2013.01)

(58) Field of Classification Search
CPC ............. H04L 41/0895; H04L 41/0806; H04L 41/0897; H04L 41/145; H04W 24/02

(Continued)

(56) References Cited

U.S. PATENT DOCUMENTS 12,323,305 B2 * 6/2025 Chong .................... H04L 41/16
12,361,371 B2 * 7/2025 Cella ........................ G06N 7/01
(Continued)

FOREIGN PATENT DOCUMENTS

| CN | 112187547 A | 1/2021 |
| EP | 3748811 A1 | 12/2020 |
| KR | 20200110031 A | 9/2020 |

OTHER PUBLICATIONS

5G Alliance for Connected Industries and Automation, "Using Digital Twins to Integrate 5G into Production Networks", 5G-ACIA White Paper, Feb. 28, 2021.

*Primary Examiner* — Kenneth R Coulter
(74) *Attorney, Agent, or Firm* — Foley and Lardner LLP

(57) ABSTRACT

This application discloses a digital twin subsystem and a service providing apparatus. A specific implementation solution is as follows: A digital twin subsystem includes: digital twin user equipment DT-UE and at least one of a digital twin application function DT-AF, a digital twin core network DT-CN function, a digital twin radio access network DT-RAN function, and a first function used to provide digital twin control and/or management. The DT-UE is configured to provide a terminal function related to a digital twin network. The DT-AF is used to provide a data network service related to the digital twin network. The DT-CN function is used to provide a core network service related to the digital twin network. The DT-RAN function is used to provide a radio access network service related to the digital twin network.

16 Claims, 5 Drawing Sheets

(58) Field of Classification Search
    USPC .................................. 709/200–222, 220–222
    See application file for complete search history.

(56)                    References Cited

U.S. PATENT DOCUMENTS

| 2020/0259896 | A1  | 8/2020 | Sachs et al. | |
|--------------|-----|--------|--------------|-----------|
| 2021/0133650 | A1* | 5/2021 | Cella ...................... | G06N 3/044 |
| 2021/0133669 | A1* | 5/2021 | Cella .................... | G05B 19/042 |
| 2024/0064066 | A1* | 2/2024 | Chong ................... | H04L 12/12 |
| 2024/0160466 | A1* | 5/2024 | Yuan .................... | H04W 24/02 |
| 2024/0205212 | A1* | 6/2024 | Ke ......................... | H04L 63/08 |

* cited by examiner

DIGITAL TWIN SUBSYSTEM AND SERVICE PROVIDING APPARATUS

CROSS-REFERENCE TO RELATED APPLICATIONS

This application is a Bypass Continuation application of PCT International Application No. PCT/CN2022/106727 filed on Jul. 20, 2022, which claims priority to Chinese Patent Application No. 202110839328.2 filed in China on Jul. 23, 2021, each of which are incorporated herein by reference in its entirety.

TECHNICAL FIELD

This application belongs to the field of communications technologies, and specifically, to a digital twin subsystem and a service providing apparatus.

BACKGROUND

As new mobile network services emerge and a network scale continuously expands, network operation and maintenance are becoming more complex. Therefore, digital twins are considered to be one of important directions of future mobile communication networks, providing a full life cycle of intelligent operation and maintenance and intelligent autonomy for the mobile communication networks. However, there is currently no clear method for how to build a digital twin solution corresponding to a physical communication network.

SUMMARY

According to a first aspect, a digital twin subsystem is provided, including:

digital twin user equipment (DT-UE) and at least one of a digital twin application function (DT-AF), a digital twin core network (DT-CN) function, a digital twin radio access network (DT-RAN) function, and a first function used to provide digital twin control and/or management, where the DT-UE is configured to provide a terminal function related to a digital twin network; the DT-AF is used to provide a data network service related to the digital twin network; the DT-CN function is used to provide a core network service related to the digital twin network; and the DT-RAN function is used to provide a radio access network service related to the digital twin network.

According to a second aspect, a service providing apparatus is provided, applied to a DT-AF in the digital twin subsystem described above, where the apparatus includes:

a first execution module, configured to provide a data network service related to a digital twin network.

According to a third aspect, a service providing apparatus is provided, applied to a first function in the digital twin subsystem described above, where the apparatus includes:

a second execution module, configured to provide digital twin control and/or management.

According to a fourth aspect, a computer program/program product is provided, where the computer program/program product is stored in a non-transient storage medium, and the program/program product is used to implement a function of the module in the second aspect or the third aspect.

DESCRIPTION OF EMBODIMENTS

Figure 1:
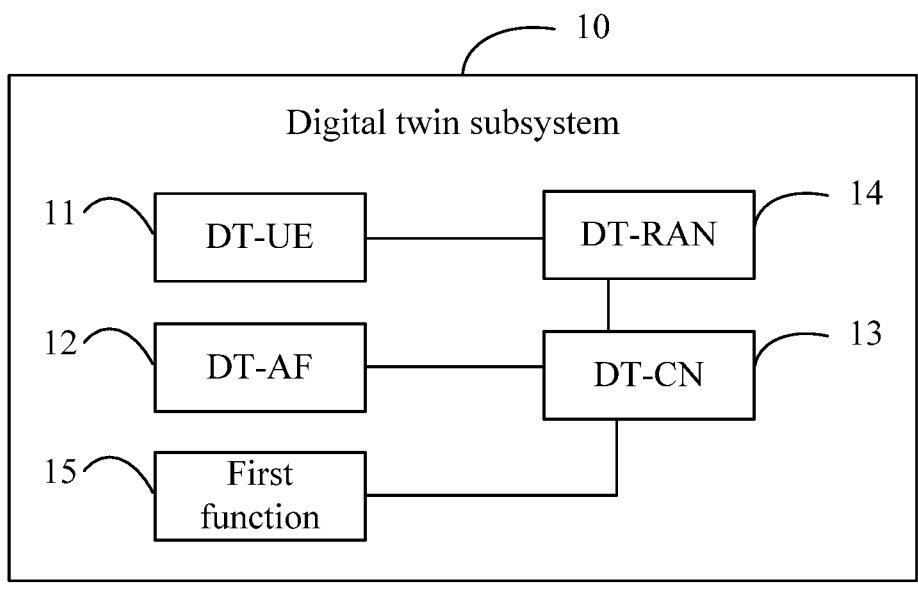
FIG. 1 is a schematic diagram of a structure of a digital twin subsystem according to an embodiment of this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It should be noted that, the technologies described in the embodiments of this application are not limited to a long term evolution (LTE)/LTE-Advanced (LTE-A) system, and may further be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" in the embodiments of this application may be often used interchangeably. The described technologies can be applied to both the systems and the radio technologies mentioned above as well as to other systems and radio technologies, such as a 5<sup>th</sup> generation (5G) communications system and a 6<sup>th</sup> generation (6G) communications system.

To understand the embodiments of this application, the following content is first described.

A digital twin is an emulation process of integrating a plurality of disciplinaries, a plurality of physical quantities, a plurality of scales, a plurality of probabilities, and the like by fully using data such as physical models, sensor updates, and operation histories, to complete mapping in virtual space, to reflect a full life cycle process of corresponding physical equipment.

Network function virtualization (NFV) is to build a network function virtualization infrastructure based on common hardware resources, to implement telecommunications network deployment through separation between software and hardware. Based on an NFV technology, hardware resources may be flexibly allocated, to implement sharing or isolation between hardware resources with different network functions. In addition, for example, based on a service-oriented architecture of a 5G core network, a 5G core network function may also implement sharing or isolation of a network function based on a service scenario requirement.

Optionally, a physical network function in the embodiments of this application includes a radio access network function (for example, a base station) and a core network function in a physical network. The core network function may include but is not limited to a mobility management entity (MME), an access management function (AMF), a session management function (SMF), a user plane function (UPF), a serving gateway (SGW), a PDN gateway, a policy control function (PCF), a policy and charging rules function (PCRF), a serving GPRS support node (SGSN), a gateway GPRS support node (GGSN), unified data management (UDM), a unified data repository (UDR), a home subscriber server (HSS), an application function (AF), and the like.

Optionally, a physical terminal in the embodiments of this application is, for example, user equipment (UE), and may be a terminal side device, such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device or vehicular user equipment (VUE), or pedestrian user equipment (PUE). The wearable device includes a smartwatch, a band, a headset, glasses, and the like.

With reference to the accompanying drawings, the following describes a digital twin subsystem and a service providing apparatus in detail by using some embodiments and application scenarios thereof.

FIG. 1 is a schematic diagram of a structure of a digital twin subsystem according to an embodiment of this application. As shown in FIG. 1, the digital twin subsystem (DTS) 10 at least includes: digital twin user equipment (DT-UE) 11, and at least one of a digital twin application function (DT-AF) 12, a digital twin core network (DT-CN) function 13, a digital twin radio access network (DT-RAN) function 14, and a first function 15 used to provide digital twin control and/or management.

Optionally, the DT-UE 11 is configured to provide a terminal function related to a digital twin network, including but not limited to performing at least one of the following: exchanging a control message with a network function, transmitting user plane data to the network function and a data network function, and the like. The DT-AF 12 is used to provide a data network service related to the digital twin network, including but not limited to exchanging at least one of the following with the DT-UE: a digital twin service configuration, digital twin service control, digital twin service information, and the like. The DT-CN function 13 is used to provide a core network service related to the digital twin network. A corresponding functional range includes but is not limited to an access and mobility management function of a digital twin field, a session management function, a user plane function, and the like. The DT-RAN function 14 is used to provide a radio access network service related to the digital twin network. A corresponding functional range includes but is not limited to a digital twin control function of a radio access network, a radio link control and user plane function, and the like.

Optionally, the first function 15 is a newly added network function, may be referred to as a digital twin control function (DTCF), a digital twin management function (DTMF), or the like, and is mainly used to provide digital twin control and/or management and the like. The first function 15 may be described on a core network control plane and may interact with a control plane network function through a service-oriented interface.

In some embodiments, the first function may be integrated with or separated from a digital twin network function. When the first function is separated from the digital twin network function, the first function is an interface through which the digital twin network function interacts with a physical network, and a corresponding function may be completed by another separate function.

In some embodiments, the digital twin subsystem may be described based on an existing 3rd generation partnership project (3GPP) network architecture, or may be described based on a future 3GPP network architecture. This is not limited.

Therefore, in this embodiment of this application, the digital twin subsystem may be described, and includes the DT-UE, and at least one of the DT-AF, the DT-CN function, the DT-RAN function, and the first function used to provide digital twin control and/or management, so that a digital twin solution corresponding to a physical communication network can be built and a digital twin service is flexibly supported as required. Further, by virtue of the digital twin subsystem in this application, a problem of air interface reuse and terminal reuse in a digital twin and a problem of a digital twin of an air interface and a digital twin of a terminal in a mobile network may be effectively resolved.

In this embodiment of this application, based on a digital twin service requirement, the digital twin network function in the digital twin subsystem may be a digital twin field model of the digital twin network function, or a mirror of a physical network function corresponding to the digital twin network function. The digital twin field model of the digital twin network function may be inconsistent with the physical network function corresponding to the digital twin network function. For example, corresponding processing processes are inconsistent, and corresponding outputs are highly similar when inputs are the same. However, when the digital twin network function is the mirror of the physical network function corresponding to the digital twin network function, the digital twin network function is consistent with the corresponding physical network function. For example, corresponding processing processes are consistent, and corresponding outputs are also the same when inputs are the same.

For example, the DT-UE may be a digital twin field model of the DT-UE or a mirror of physical UE; and/or the DT-AF may be a digital twin field model of the DT-AF or a mirror of the corresponding physical network function; and/or the DT-CN function may be a digital twin field model of the DT-CN function or a mirror of the corresponding physical network function; and/or the DT-RAN function may be a digital twin field model of the DT-RAN function or a mirror of the corresponding physical network function.

In some optional embodiments, the DT-RAN function may twin a related interaction message from N2 and N3 interfaces based on the digital twin field model, or may be a mirror of one or some cells in the digital twin field, meaning that internal processing of the DT-RAN function is exactly the same as internal processing of the corresponding physical network function and is not simulated based on the model.

In this embodiment of this application, the first function may perform an interaction related to a digital twin with the physical network function, to keep the digital twin network function synchronized with and isolated from the physical network function. The first function may interact with the DT-CN function (such as a DT-AMF, a DT-SMF, or a DT-UPF), the DT-RAN function (for example, a DT-gNB-CU), and/or, the DT-UE to complete a digital twin function. A related procedure includes at least one of the following:

(1) obtaining, based on digital twin network configuration information, status information that is of the physical network function and that is required by the digital twin network function, so that a status of the digital twin network function is synchronized with a status of the physical network function;

(2) establishing, based on the digital twin network configuration information, a DT-UE context of the digital twin field by interacting with a core network CN function in the physical network, so that the digital twin network function is isolated from the physical network function;

(3) performing digital twin configuration on the DT-RAN function and/or the DT-UE, to complete a network function and a procedure that are related to a digital twin;

(4) when the digital twin service needs to be externally provided, providing the digital twin service by interacting with a network exposure function (NEF);

(5) directly or indirectly exchanging information related to the digital twin service with the DT-AF, such as digital twin service control information, digital twin service data, or a digital twin service report; and (6) when charging is required, exchanging charging information with a charging function, for example, a charging data record (CDR), where the charging information may be generated by the first function or another digital twin network function. For example, the first function may perform charging based on a quantity of times of the digital twin service. Alternatively, the DT-UPF performs charge-by-traffic to report the information to the first function, and then the first function is responsible for interacting with a communication history report (CHR).

Optionally, when the digital twin configuration is performed on the DT-RAN function and/or the DT-UE, the first function is used to perform at least one of the following:

performing digital twin registration on the DT-RAN function and/or the DT-UE;

performing digital twin authentication on the DT-RAN function and/or the DT-UE;

performing a digital twin configuration update on the DT-RAN function and/or the DT-UE;

performing session management on the DT-UE; and performing context management on the DT-UE.

Optionally, when the digital twin service is provided by interacting with the NEF, the first function is used to: receive a subscription event from the NEF as a subscription or unsubscription request message of the digital twin service, send a subscription response message to the NEF, and monitor subscription message content; and when generation of the subscription message content is monitored, send a notification message to the NEF.

It should be pointed out that if the first function provides the digital twin service by using the NEF, a digital twin needs to be added as event exposure (event exposure using NEF), and a digital twin monitoring event and an information flow are added.

In an implementation, a definition of the digital twin service of the mobile network may be added to an existing list of events for monitoring capabilities.

Figure 2:
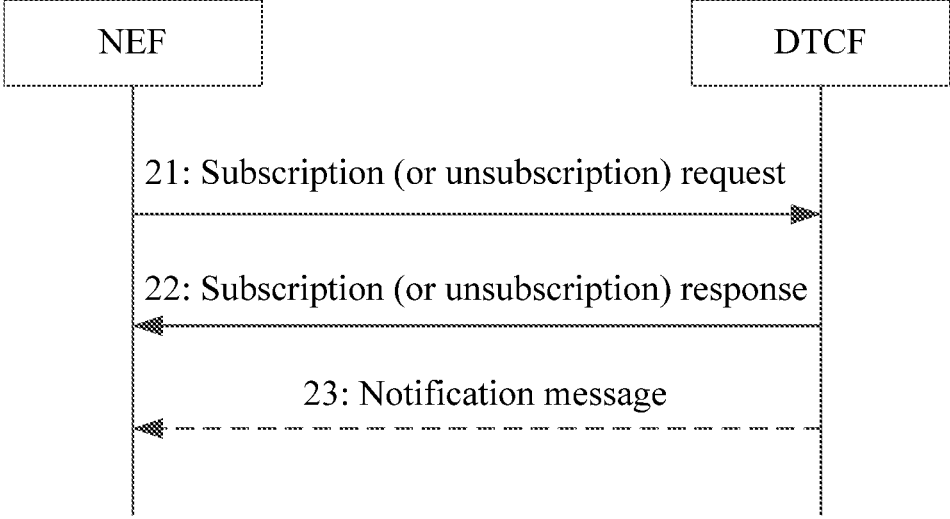
FIG. 2 is a schematic flowchart of providing a digital twin service by a DTCF according to an embodiment of this application.

For example, as shown in FIG. 2, an example in which the first function is the DTCF is used, and a related procedure of the DTCF providing the digital twin service through interaction with the NEF may include the following steps:

Step 21: After an external function subscribes to the digital twin service from the NEF, where an event is the digital twin service (digital twin network service), the NEF sends a subscription event as a subscription (or unsubscription) request message of the digital twin service to the DTCF, for example, sends Ndts_EventExposure_(Un)Subscribe Request.

Step 22: After receiving the foregoing subscription (or unsubscription) request message, the DTCF sends a subscription (or unsubscription) response message based on information that is related to a digital twin and that is subscribed in the subscription (or unsubscription) request message, for example, sends Ndts_EventExposure_(Un) Subscribe Response.

Step 23: If the subscription request is accepted, the DTCF needs to monitor whether the subscribed digital twin information is generated; and further, if there is corresponding subscription information, sends the subscribed information to the NEF by using a notification message (for example, Ndts_EventExposure_Notify).

In this embodiment of this application, the DT-AF may provide a data network service related to the digital twin network, and initiate the digital twin service based on user authorization information of the DT-UE. The initiating the digital twin service may include at least one of the following:

sending, by the DT-AF, digital twin service configuration information (which may also be referred to as control information) to the DT-UE;

receiving, by the DT-AF, configuration success information or configuration failure information sent by the DT-UE, where if the DT-UE supports the digital twin service, the configuration success information is returned; however, if the UE does not support the digital twin service, the configuration failure information needs to be returned;

reporting, by the DT-AF to the first function, the configuration failure information fed back by the DT-UE;

sending, by the DT-AF, digital twin service starting information and/or termination information to the DT-UE; and sending and/or receiving, by the DT-AF, a digital twin service message.

Optionally, the DT-AF may exchange the digital twin service with the DT-UE, and exchange at least one of the following information:

digital twin service control information;

digital twin service data; and a digital twin service report.

In this embodiment of this application, when the digital twin network relates to user-level data or user participation, the first function may be used to perform at least one of the following:

(1) before the digital twin service is performed, if physical UE related to the digital twin service is in an idle state, triggering the physical network function to perform a paging procedure of the physical UE, to wake up the physical UE to perform the corresponding digital twin service;

(2) triggering and/or establishing an N1 termination in a digital twin field based on digital twin configuration information, where for example, when the DT-UE is configured in a pure digital twin mode, the first function may trigger a physical AMF to perform a configuration update procedure of related UE, and migrate the UE N1 termination from the physical AMF to a corresponding function of the digital twin field;

(3) controlling an authentication procedure related to the DT-UE and/or the digital twin network function, where for example, the first function may execute the authentication procedure related to the DT-UE and/or the digital twin network function, or trigger the AMF to execute the authentication process related to the DT-UE and/or the digital twin network function; and (4) when user charging is performed, exchanging charging information with a charging function, for example, a charging data record (CDR), where the charging information may be generated by the first function or another digital twin network function.

In this embodiment, the first information may be further used to perform at least one of the following:

(1) Forward and/or process a digital twin service request and response.

It should be noted that the digital twin service request and response in (1) may be processed by the first function, or may be forwarded by the first function to another network function in the digital twin subsystem for processing. For example, when the digital twin network relates to the user-level data or user participation, the first function may forward and/or process the digital twin service request and response.

Optionally, when the digital twin service request and response are processed, the first function is used to: when the digital twin network shares the N1 termination with the physical network, by interacting with the N1 termination or the physical network function at which the N1 termination is located, receive a digital twin service request message, and send a digital twin service response message.

Optionally, the digital twin service request message includes digital twin service type information, and the digital twin service type information is used to indicate that a service requested based on the digital twin service request message is a digital twin service, so that a corresponding network function interacts with the first function to complete requesting, accepting, or rejection of the digital twin service. In addition, the foregoing digital twin service request message may carry a digital twin service identifier (DTS identifier) information unit, to facilitate service identification in a case of a plurality of digital twin services.

In an implementation, the digital twin service type information may be based on a 24.501 message type definition, and a digital twin service type definition may be newly added by using an unused field or a reserved field.

In some embodiments, if necessary, the physical UE may alternatively initiate the digital twin service request based on a slice.

(2) Forward and/or process digital twin service session management.

It should be noted that the digital twin service session management in (2) may be processed by the first function, or may be forwarded by the first function to another network function in the digital twin subsystem for processing. For example, when the digital twin network relates to the user-level data or user participation, the first function may forward and/or process the digital twin service session management.

Optionally, when the digital twin service session management is forwarded and/or processed, the first function is used to: when the digital twin network shares the N1 termination with the physical network, by interacting with the N1 termination or the physical network function at which the N1 termination is located, forward and/or process a message related to the digital twin service session management. For example, the service session management includes procedures such as establishment, modification, and releasing.

(3) Forward and/or process digital twin authentication.

It should be noted that the digital twin authentication in (3) may be processed by the first function, or may be forwarded by the first function to another network function in the digital twin subsystem for processing.

Optionally, when the digital twin authentication is processed, the first function is used to: send a digital twin authentication request message and receive a digital twin authentication response message. The digital twin authentication request message and the digital twin authentication response message include a digital twin service identifier, and the digital twin service identifier is used to indicate digital twin service content for which authentication is requested.

Further, the first function is specifically used to: send the digital twin authentication request message to a core network function in the physical network, and receive the digital twin authentication response message fed back by the core network function in the physical network. The digital twin authentication request message is used by the core network function in the physical network to send a digital twin authentication control message to the physical UE, and to receive a digital twin authentication result message fed back by the physical UE.

(4) When the digital twin network has an independent N1 termination, establish and/or configure a digital twin N1 termination for the DT-UE.

The embodiments of this application are described below in detail with reference to FIG. 3 to FIG. 7.

Embodiment 1

Figure 3:
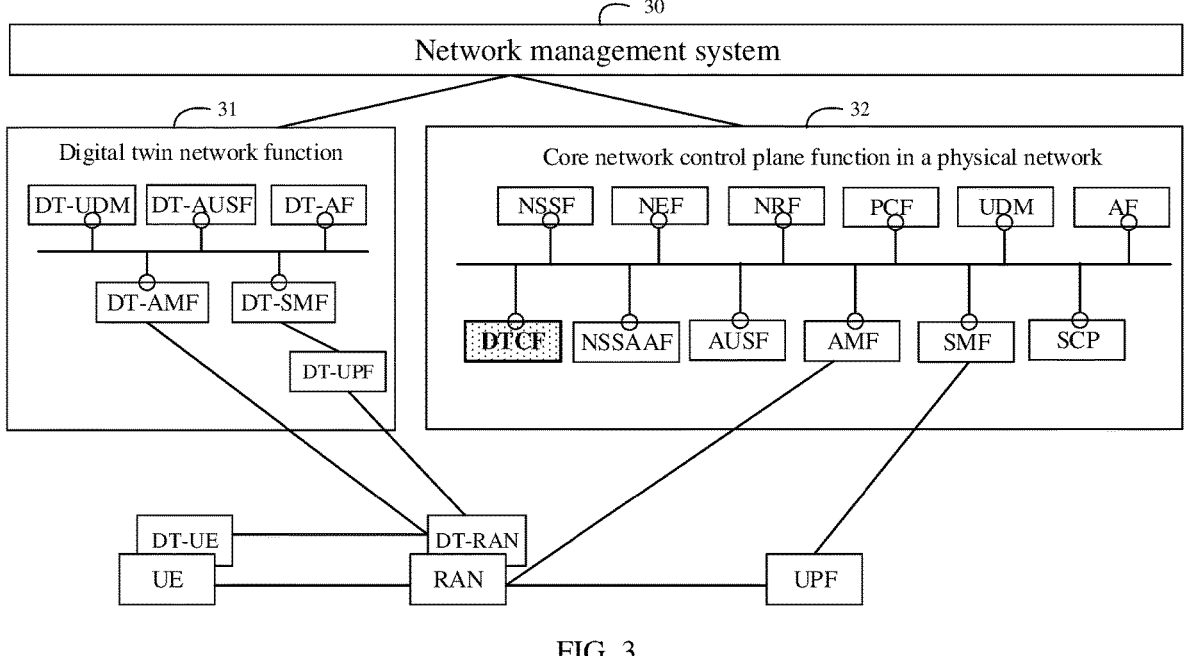
FIG. 3 is a schematic diagram of a structure of a network management system according to an embodiment of this application.

In Embodiment 1, an example in which a first function is a DTCF is used. FIG. 3 is a schematic diagram of a structure of a network management system according to an embodiment of this application. As shown in FIG. 3, the network management system 30 includes at least digital twin network functions 31 and core network control plane functions 32 in a physical network. The digital twin network functions 31 include at least a DT-UDM, a DT-AUSF, a DT-AF, a DT-AMF, a DT-SMF, a DT-UPF, and the like, and information may be exchanged between the network functions. The core network control plane functions 32 include at least an NSSF, a NEF, an NRF, a PCF, a UDM, an AF, an NSSAAF, an AUSF, an AMF, an SMF, an SCP, a DTCF, and the like, and information may be exchanged between the network functions. In addition, the digital twin network function 31 may interact with DT-UE by using a DT-RAN function, and the core network control plane function 32 may interact with physical UE by using a physical RAN, or a physical UPF and a physical RAN.

Optionally, in this embodiment, the DTCF may be described on the core network control plane of the physical network based on a 5G system, and may interact with a control plane network function through a service-oriented interface. The digital twin network function may be integrated with or separated from the DTCF. When the digital twin network function is separated from the DTCF, the DTCF is an interface through which the digital twin network function interacts with the physical network, and a backend function may be completed by another separate function. The digital twin network function includes different functions based on different digital twin needs. For example, when UE access and mobility management are not performed, and an N1 termination is shared with the physical network, there is no DT-AMF function in a digital twin network.

Figure 4:
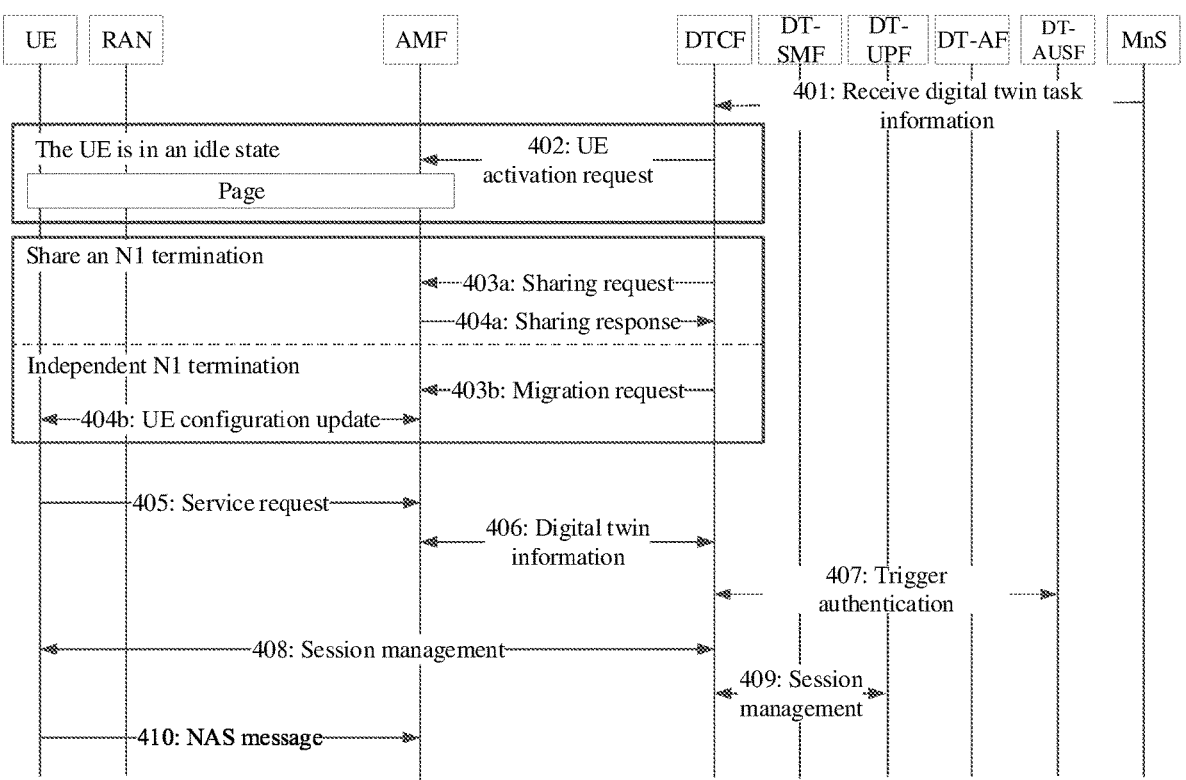
FIG. 4 is a schematic diagram of a procedure related to a digital twin according to an embodiment of this application.

As shown in FIG. 4, a procedure related to a digital twin in Embodiment 1 may include the following steps.

Step 401: The DTCF receives digital twin task information sent by a network management system (NMS), such as DT-CN information, DT-RAN information, or DT-UE information, to interact with a physical network function based on the information, to obtain status information, so that a status of the digital twin network function is updated to synchronize the DTCF and the physical network function.

Optionally, if a digital twin task relates to a RAN, the DTCF performs configuration on a DT-RAN. The configuration may include a frequency, an access policy, or the like. However, if the DT-RAN shares a resource with the RAN in the physical network, the DTCF needs to send DT-RAN configuration activation and deactivation messages. Optionally, the DT-RAN authenticates the DTCF and a related configuration, to ensure isolation of the digital twin network from the physical network.

Optionally, if the digital twin task relates to UE, the DTCF interacts with a core network function in the physical network based on corresponding DT-UE identification information, to query for UE context information.

Step 402: Optionally, if the UE to which the digital twin task relates is in an idle state, the DTCF sends a UE activation request to a core network AMF in the physical network, so that the AMF converts the UE from the idle state to a connected state through paging or in another enhanced manner.

Step 403a: Optionally, if the digital twin network shares the N1 termination with the physical network, the DTCF sends a sharing request (for example, an N1 termination digital twin share request) to the AMF in the physical network.

Step 404a: The AMF feeds back a sharing response (for example, an N1 termination digital twin share response) to the DTCF. The AMF can support transparent transmission of a NAS message related to a digital twin.

Step 403b: Optionally, if the digital twin network has an independent N1 termination, and configuration information (in a time interval) of the UE is in a pure digital twin mode, the DTCF sends an N1 termination migration request to the core network AMF in the physical network.

Step 404b: The AMF and the physical UE update a UE configuration, migrates the UE to the AMF in a digital twin field through re-registration, and optionally authenticates the UE and the digital twin network.

Step 405: When performing the digital twin service, the physical UE initiates a digital twin service request (for example, a service request) to the AMF in the physical network by using the NAS message. For example, when the digital twin network shares the N1 termination with the physical network, digital twin field processing and interaction is performed on the request message by using the DTCF.

Step 406: The AMF exchanges digital twin service information with the DTCF.

Step 407: Optionally, the DTCF triggers digital twin service authentication, to complete a security procedure related to a digital twin of the UE.

Steps 408 and 409: Optionally, the DTCF performs session management (for example, session management) related to the digital twin service, where the session management message also needs to be transparently transmitted by the AMF in the physical network during sharing of the N1 termination, and is processed and exchanged by using the DTCF.

Step 410: The AMF transparently transmits a service accept/reject message, a session management message, or the like to the physical UE by using the NAS message.

Embodiment 2

Figure 5:
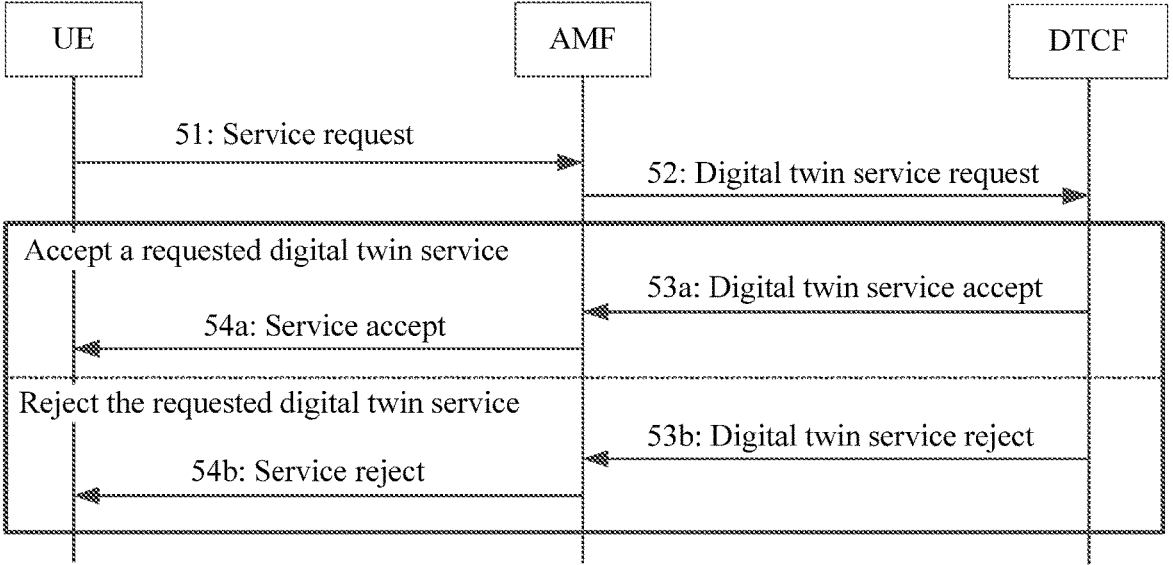
FIG. 5 is a schematic diagram of a process of requesting a digital twin service according to an embodiment of this application.

In Embodiment 2, an example in which a first function is a DTCF is used. As shown in FIG. 5, a process of requesting a digital twin service may include the following steps:

Step 51: DT-UE sends a service request (for example, a service request) message to an AMF in a physical network, where the service request message carries digital twin service type information, and the digital twin service type information is used to indicate that a requested service is a digital twin service.

Step 52: The AMF sends a digital twin service request (for example, a digital twin service request) message to the DTCF based on the digital twin service type information, where the digital twin service request message carries the digital twin service type information.

Step 53a: Optionally, if a DT-CN accepts the requested digital twin service, the DTCF sends a digital twin service accept (for example, digital twin service accept) message to the AMF.

Step 54a: The AMF sends a service accept (for example, service accept) message to the DT-UE.

Step 53b: Optionally, if the DT-CN rejects the requested digital twin service, the DTCF sends a digital twin service reject message to the AMF.

Step 54b: The AMF sends a service reject (for example, service reject) message to the DT-UE.

Optionally, the digital twin service request may carry a digital twin service identifier (DTS identifier) information unit, to facilitate service identification in a case of a plurality of digital twin services.

It should be noted that the foregoing service request message, service accept message, and service reject message may be supported by transparently transmitting a NAS message by the AMF.

Embodiment 3

Figure 6:
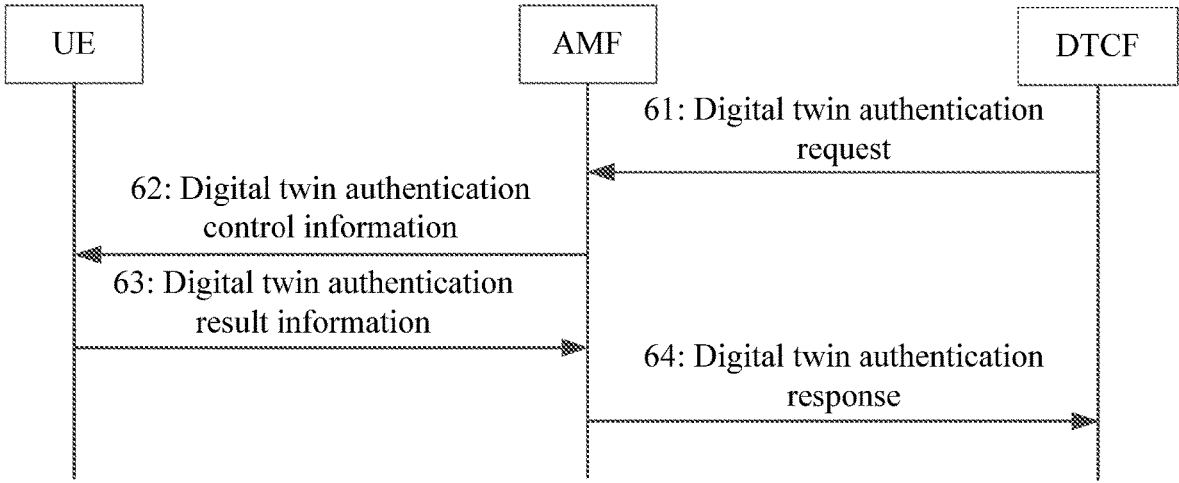
FIG. 6 is a schematic diagram of a digital twin service authentication process according to an embodiment of this application.

In Embodiment 3, an example in which a first function is a DTCF is used. As shown in FIG. 6, a digital twin service authentication process may include the following steps:

Step 61: The DTCF sends a digital twin authentication request (for example, a digital twin specific authentication request) message to an AMF in a physical network, where the digital twin authentication request message may carry information such as a DTS ID and/or an S-NSSAI.

Step 62: The AMF transparently transmits digital twin authentication command (for example, DT-SPECIFIC AUTHENTICATION COMMAND) information, a DTS ID, an S-NSSAI, and/or the like to the physical UE by using a NAS message 1. The NAS message 1 includes digital twin authentication control information unit configured to identify the message.

Step 63: Physical UE transparently transmits digital twin authentication result (for example, DT-SPECIFIC AUTHENTICATION RESULT) information, a DTS ID, an S-NSSAI, and/or the like to the AMF by using a NAS message 2. The NAS message 2 includes digital twin authentication result information unit configured to identify the message.

In an implementation, a solution of defining two message types that are DT-SPECIFIC AUTHENTICATION COMMAND and DT-SPECIFIC AUTHENTICATION RESULT is based on a 24.501 message type definition in a 5G system, and a digital twin authentication message type definition is newly added.

Step 64: The AMF feeds back a digital twin authentication response (for example, a digital twin specific authentication response) message to the DTCF, where the digital twin authentication response message may carry information such as a DTS ID and/or an S-NSSAI.

It should be pointed out that, for each message in the foregoing authentication process, a digital twin service identifier (DTS identifier) information unit is a field required to be carried, to ensure a progress of the authentication process.

Embodiment 4

Figure 7:
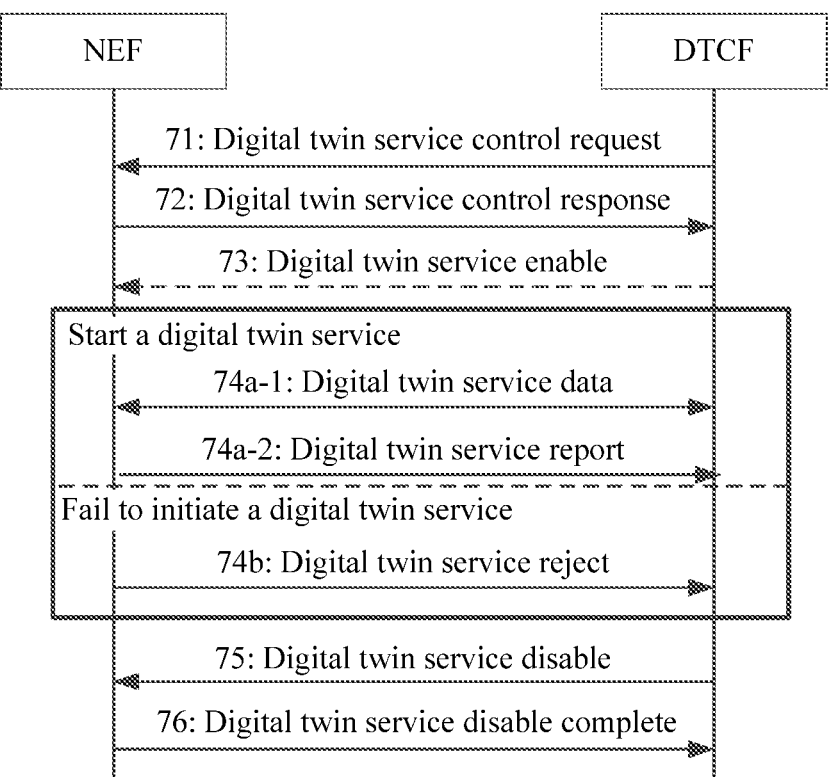
FIG. 7 is a schematic diagram of a process of exchanging a digital twin service according to an embodiment of this application.

In Embodiment 4, an example in which a first function is a DTCF is used. As shown in FIG. 7, a process of exchanging a digital twin service between a DT-AF and DT-UE may include the following steps:

Step 71: The DT-AF sends digital twin service control information to the DT-UE by using a digital twin service control request (for example, a digital twin service control request) message, where the digital twin service control information is used to configure a digital twin service and an exception report. For example, a configuration of the digital twin service may be a service type, such as File Transfer Protocol (FTP), and/or IP address (Internet Protocol address) information corresponding to the service.

Step 72: The DT-UE feeds back success information to the DT-AF by using a digital twin service control response (for example, a digital twin service control response) message based on terminal side information.

Step 73: The DT-AF sends a digital twin service enable message to the DT-UE, so that the DT-UE can start the digital twin service.

It should be pointed out that FIG. 7 shows a feedback success of the DT-UE. However, in addition, the DT-UE may also feedback failure information in the response message based on the terminal side information. In this case, the DT-AF sends a digital twin service disable message to the DT-UE.

Optionally, if the DT-UE starts the digital twin service, steps 74*a*-1 and/or steps 74*a*-*b* may be performed. Alternatively, if the DT-UE fails to initiate the digital twin service, step 74*b* may be performed.

Step 74*a*-1: The DT-UE exchanges digital twin service data with the DT-AF, where in an exchanging process, a network-side digital twin function may collect related digital twin service information and report the digital twin service information to the DT-AF.

Step 74*a*-2: The DT-UE sends a digital twin service report to the DT-AF. If the digital twin service needs to be processed on a terminal side, corresponding service information needs to be reported to the DT-AF.

Step 74*b*: The DT-UE sends a digital twin service reject (for example, digital twin service reject) message to the DT-AF.

Step 75: The DT-AF sends a digital twin service disable (for example, digital twin service disable) message to the DT-UE.

Step 76: The DT-UE sends a digital twin service disable complete (for example, digital twin service disable complete) message to the DT-AF.

Figure 8:
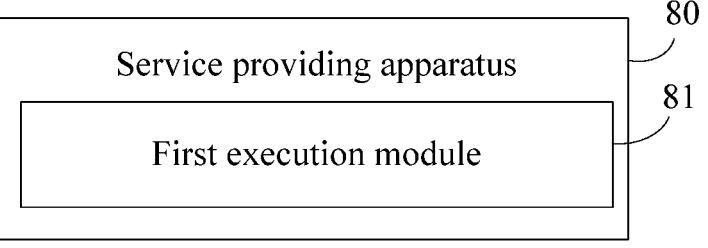
FIG. 8 is a schematic diagram of a structure of a service providing apparatus according to an embodiment of this application.

FIG. 8 is a schematic diagram of a structure of a service providing apparatus according to an embodiment of this application. The apparatus is applied to the DT-AF in the digital twin subsystem shown in FIG. 1. As shown in FIG. 8, the service providing apparatus 80 includes:

a first execution module 81, configured to provide a data network service related to a digital twin network.

Optionally, the first execution module 81 is configured to initiate a digital twin service based on user authorization information of DT-UE, where the initiating a digital twin service includes at least one of the following:

sending digital twin service configuration information to the DT-UE;

receiving configuration success information or configuration failure information sent by the DT-UE;

reporting, to the first function, the configuration failure information fed back by the DT-UE;

sending digital twin service starting information and/or termination information to the DT-UE; and sending and/or receiving a digital twin service message.

Optionally, the first execution module 81 is configured to:

when the DT-AF exchanges a digital twin service with the DT-UE, exchange at least one of the following information:

digital twin service control information;

digital twin service data; and a digital twin service report.

It can be understood that the service providing apparatus 80 provided in this embodiment of this application may implement a related procedure that can be implemented by the DT-AF shown in FIG. 1, and a same technical effect can be achieved. To avoid repetition, details are not described herein again.

Figure 9:
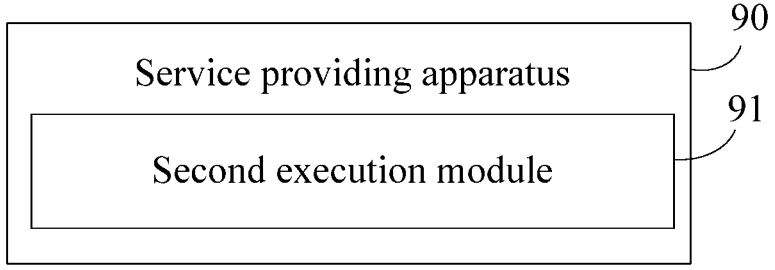
FIG. 9 is a schematic diagram of a structure of another service providing apparatus according to an embodiment of this application.

FIG. 9 is a schematic diagram of a structure of a service providing apparatus according to an embodiment of this application. The apparatus is applied to the first function in the digital twin subsystem shown in FIG. 1. As shown in FIG. 9, the service providing apparatus 90 includes:

a second execution module 91, configured to provide digital twin control and/or management.

Optionally, the second execution module 91 is configured to perform at least one of the following:

obtaining, based on digital twin network configuration information, status information that is of a physical network function and that is required by a digital twin network function;

establishing, based on the digital twin network configuration information, a DT-UE context of a digital twin field by interacting with a core network function in a physical network;

performing digital twin configuration on a DT-RAN function and/or DT-UE;

when a digital twin service needs to be externally provided, providing the digital twin service by interacting with a network exposure function (NEF);

directly or indirectly exchanging information related to the digital twin service with a DT-AF; and when charging is required, exchanging charging information with a charging function.

Optionally, when the digital twin configuration is performed on the DT-RAN function and/or the DT-UE, the second execution module 91 is configured to perform at least one of the following:

performing digital twin registration on the DT-RAN function and/or the DT-UE;

performing digital twin authentication on the DT-RAN function and/or the DT-UE;

performing a digital twin configuration update on the DT-RAN function and/or the DT-UE;

performing session management on the DT-UE; and performing context management on the DT-UE.

Optionally, when the digital twin service is provided by interacting with the NEF, the second execution module 91 is configured to perform the following content:

receiving a subscription event from the NEF as a subscription or unsubscription request message of the digital twin service, sending a subscription response message to the NEF, and monitoring subscription message content; and when generation of the subscription message content is monitored, sending a notification message to the NEF.

Optionally, when a digital twin network relates to user-level data or user participation, the second execution module 91 is configured to perform at least one of the following:

before the digital twin service is performed, if physical UE related to the digital twin service is in an idle state, triggering a physical network function to perform a paging procedure of the physical UE;

triggering and/or establishing an N1 termination of the digital twin field based on digital twin configuration information;

controlling an authentication procedure related to the DT-UE and/or the digital twin network function; and when user charging is performed, exchanging charging information with a charging function.

Optionally, the second execution module 91 is further configured to perform at least one of the following:

forwarding and/or processing a digital twin service request and response;

forwarding and/or processing digital twin service session management;

forwarding and/or processing digital twin authentication; and when the digital twin network has an independent N1 termination, establishing and/or configuring a digital twin N1 termination for the DT-UE.

Optionally, when the digital twin service request and response are processed, the second execution module 91 is configured to:

when the digital twin network shares the N1 termination with the physical network, by interacting with the N1 termination or the physical network function at which the N1 termination is located, receive a digital twin service request message, and send a digital twin service response message.

Optionally, the digital twin service request message includes digital twin service type information, and the digital twin service type information is used to indicate that a service requested based on the digital twin service request message is a digital twin service.

Optionally, when the digital twin service session management is forwarded and/or processed, the second execution module 91 is configured to:

when the digital twin network shares the N1 termination with the physical network, by interacting with the N1 termination or the physical network function at which the N1 termination is located, forward and/or process a message related to the digital twin service session management.

Optionally, when the digital twin authentication is processed, the second execution module 91 is configured to:

send a digital twin authentication request message, and receive a digital twin authentication response message, where the digital twin authentication request message and the digital twin authentication response message include a digital twin service identifier, and the digital twin service identifier is used to indicate digital twin service content for which authentication is requested.

Optionally, the second execution module 91 is configured to: send the digital twin authentication request message to a core network function in the physical network, and receive the digital twin authentication response message fed back by the core network function in the physical network, where the digital twin authentication request message is used by the core network function in the physical network to send a digital twin authentication control message to the physical UE, and to receive a digital twin authentication result message fed back by the physical UE.

It can be understood that the service providing apparatus 90 provided in this embodiment of this application may implement a related procedure that can be implemented by the first function shown in FIG. 1, and a same technical effect can be achieved. To avoid repetition, details are not described herein again.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A digital twin subsystem, comprising:

digital twin user equipment (DT-UE), a first function used to provide digital twin control and/or management, and at least one of a digital twin application function (DT-AF), a digital twin core network (DT-CN) function, or a digital twin radio access network (DT-RAN) function, wherein the DT-UE is configured to provide a terminal function related to a digital twin network; the DT-AF is used to provide a data network service related to the digital twin network; the DT-CN function is used to provide a core network service related to the digital twin network; and the DT-RAN function is used to provide a radio access network service related to the digital twin network, and wherein when the digital twin network relates to user-level data or user participation, the first function is used to perform at least one of triggering or establishing an N1 termination of a digital twin field based on digital twin configuration information.

2. The digital twin subsystem according to claim 1, wherein a digital twin network function in the digital twin subsystem is a digital twin field model of the digital twin network function; or a digital twin network function in the digital twin subsystem is a mirror of a physical network function corresponding to the digital twin network function.

3. The digital twin subsystem according to claim 1, wherein the first function is used to perform at least one of the following:

obtaining, based on digital twin network configuration information, status information that is of a physical network function and that is required by a digital twin network function;

establishing, based on the digital twin network configuration information, a DT-UE context of a digital twin field by interacting with a core network function in a physical network;

performing digital twin configuration on the DT-RAN function and/or the DT-UE; when a digital twin service needs to be externally provided, providing the digital twin service by interacting with a network exposure function (NEF);

directly or indirectly exchanging information related to the digital twin service with the DT-AF; or when charging is required, exchanging charging information with a charging function.

4. The digital twin subsystem according to claim 3, wherein when the digital twin configuration is performed on the DT-RAN function and/or the DT-UE, the first function is used to perform at least one of the following:

performing digital twin registration on the DT-RAN function and/or the DT-UE;

performing digital twin authentication on the DT-RAN function and/or the DT-UE;

performing a digital twin configuration update on the DT-RAN function and/or the DT-UE;

performing session management on the DT-UE; or performing context management on the DT-UE; or, wherein when the digital twin service is provided by interacting with the NEF, the first function is used to:

receive a subscription event from the NEF as a subscription or unsubscription request message of the digital twin service, send a subscription response message to the NEF, and monitor subscription message content; and when generation of the subscription message content is monitored, send a notification message to the NEF.

5. The digital twin subsystem according to claim 1, wherein the DT-AF is used to initiate a digital twin service based on user authorization information of the DT-UE, wherein the initiating the digital twin service comprises at least one of the following: sending digital twin service configuration information to the DT-UE;

receiving configuration success information or configuration failure information sent by the DT-UE;

reporting, to the first function, the configuration failure information fed back by the DT-UE;

sending digital twin service starting information and/or termination information to the DT-UE; or sending and/or receiving a digital twin service message.

6. The digital twin subsystem according to claim 1, wherein when the digital twin network relates to user-level data or user participation, the first function is further used to perform at least one of the following:

before a digital twin service is performed, if a physical UE related to the digital twin service is in an idle state, triggering a physical network function to perform a paging procedure of the physical UE;

controlling an authentication procedure related to the DT-UE and/or a digital twin network function; or when user charging is performed, exchanging charging information with a charging function.

7. The digital twin subsystem according to claim 1, wherein the first function is used to perform at least one of the following:

forwarding and/or processing a digital twin service request and response;

forwarding and/or processing digital twin service session management;

forwarding and/or processing digital twin authentication; or when the digital twin network has an independent N1 termination, establishing and/or configuring a digital twin N1 termination for the DT-UE.

8. The digital twin subsystem according to claim 7, wherein when the digital twin service request and response are processed, the first function is used to:

when the digital twin network shares the N1 termination with a physical network, by interacting with the N1 termination or a physical network function at which the N1 termination is located, receive a digital twin service request message, and send a digital twin service response message; or, wherein when the digital twin service session management is forwarded and/or processed, the first function is used to:

when the digital twin network shares the N1 termination with a physical network, by interacting with the N1 termination or a physical network function at which the N1 termination is located, forward and/or process a message related to the digital twin service session management; or, wherein when the digital twin authentication is processed, the first function is used to:

send a digital twin authentication request message, and receive a digital twin authentication response message, wherein the digital twin authentication request message and the digital twin authentication response message comprise a digital twin service identifier, and the digital twin service identifier is used to indicate digital twin service content for which authentication is requested.

9. The digital twin subsystem according to claim 8, wherein the digital twin service request message comprises digital twin service type information, and the digital twin service type information is used to indicate that a service requested based on the digital twin service request message is a digital twin service.

10. The digital twin subsystem according to claim 8, wherein when the digital twin authentication is processed, the first function is used to: send the digital twin authentication request message to a core network function in a physical network, and receive the digital twin authentication response message fed back by the core network function in the physical network, wherein the digital twin authentication request message is used by the core network function in the physical network to send a digital twin authentication control message to a physical UE, and to receive a digital twin authentication result message fed back by the physical UE.

11. The digital twin subsystem according to claim 1, wherein when the DT-AF is used to: when exchanging the digital twin service with the DT-UE, exchange at least one of the following information:

digital twin service control information;

digital twin service data; or a digital twin service report.

12. A non-transitory storage medium having a computer program stored thereon, wherein the computer program is used to implement a function of a first function of a digital twin subsystem, wherein the computer program is configured to:

provide digital twin control and/or management, wherein when a digital twin network relates to user-level data or user participation, the computer program is configured to perform at least one of triggering or establishing an N1 termination of a digital twin field based on digital twin configuration information; and wherein the computer program is configured to perform at least one of the following:

obtaining, based on digital twin network configuration information, status information that is of a physical network function and that is required by a digital twin network function;

establishing, based on the digital twin network configuration information, a DT-UE context of a digital twin field by interacting with a core network function in a physical network;

performing digital twin configuration on a DT-RAN function and/or a DT-UE;

when a digital twin service needs to be externally provided, providing the digital twin service by interacting with a network exposure function (NEF);

directly or indirectly exchanging information related to the digital twin service with a DT-AF; or when charging is required, exchanging charging information with a charging function.

13. The non-transitory storage medium according to claim 12, wherein when the digital twin configuration is performed on the DT-RAN function and/or the DT-UE, the computer program is configured to perform at least one of the following:

performing digital twin registration on the DT-RAN function and/or the DT-UE;

performing digital twin authentication on the DT-RAN function and/or the DT-UE;

performing a digital twin configuration update on the DT-RAN function and/or the DT-UE;

performing session management on the DT-UE; or performing context management on the DT-UE; or, wherein when the digital twin service is provided by interacting with the NEF, the computer program is configured to perform:

receiving a subscription event from the NEF as a subscription or unsubscription request message of the digital twin service, sending a subscription response message to the NEF, and monitoring subscription message content; and when generation of the subscription message content is monitored, sending a notification message to the NEF.

14. The non-transitory storage medium according to claim 13, wherein the computer program is configured to perform at least one of the following:

forwarding and/or processing a digital twin service request and response;

forwarding and/or processing digital twin service session management;

forwarding and/or processing digital twin authentication; or when the digital twin network has an independent N1 termination, establishing and/or configuring a digital twin N1 termination for the DT-UE.

15. The non-transitory storage medium according to claim 14, wherein when the digital twin service request and response are processed, the computer program is configured to:

when the digital twin network shares the N1 termination with a physical network, by interacting with the N1 termination or a physical network function at which the N1 termination is located, receive a digital twin service request message, and send a digital twin service response message; or, wherein when the digital twin service session management is forwarded and/or processed, the computer program is configured to:

when the digital twin network shares the N1 termination with a physical network, by interacting with the N1 termination or a physical network function at which the N1 termination is located, forward and/or process a message related to the digital twin service session management; or, wherein when the digital twin authentication is processed, the computer program is configured to:

send a digital twin authentication request message, and receive a digital twin authentication response message, wherein the digital twin authentication request message and the digital twin authentication response message comprise a digital twin service identifier, and the digital twin service identifier is used to indicate digital twin service content for which authentication is requested.

16. The non-transitory storage medium according to claim 12, wherein when the digital twin network relates to user-level data or user participation, the computer program is further configured to perform at least one of the following:

before a digital twin service is performed, if a physical UE related to the digital twin service is in an idle state, triggering a physical network function to perform a paging procedure of the physical UE;

controlling an authentication procedure related to a DT-UE and/or a digital twin network function; or when user charging is performed, exchanging charging information with a charging function.

* * * * *